United States Patent
Mitterbacher

(10) Patent No.: US 8,994,286 B2
(45) Date of Patent: Mar. 31, 2015

(54) OPERATING DEVICE FOR A LAMP HAVING A POWER CORRECTION CIRCUIT

(75) Inventor: Andre Mitterbacher, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 14/114,054

(22) PCT Filed: Apr. 26, 2012

(86) PCT No.: PCT/AT2012/000117
§ 371 (c)(1),
(2), (4) Date: Nov. 27, 2013

(87) PCT Pub. No.: WO2012/145772
PCT Pub. Date: Nov. 1, 2012

(65) Prior Publication Data
US 2014/0125247 A1 May 8, 2014

(30) Foreign Application Priority Data

Apr. 29, 2011 (DE) .......................... 10 2011 100 012

(51) Int. Cl.
*H05B 37/02* (2006.01)
*H02M 1/42* (2007.01)
*H02M 3/156* (2006.01)
*H05B 37/00* (2006.01)

(52) U.S. Cl.
CPC .............. *H02M 1/42* (2013.01); *H02M 1/4225* (2013.01); *H02M 3/156* (2013.01); *Y02B 70/126* (2013.01); *H05B 37/00* (2013.01)
USPC .............................. 315/224; 315/247; 315/307

(58) Field of Classification Search
USPC ......... 315/224, 247, 291, 294, 297, 307, 308, 315/312; 323/282
See application file for complete search history.

(56) References Cited

U.S. PATENT DOCUMENTS

| | | | |
|---|---|---|---|
| 7,759,881 B1* | 7/2010 | Melanson | 315/307 |
| 8,730,698 B2* | 5/2014 | Duerbaum et al. | 363/89 |
| 2008/0224625 A1* | 9/2008 | Greenfeld | 315/201 |
| 2010/0026208 A1* | 2/2010 | Shteynberg et al. | 315/297 |
| 2012/0133285 A1 | 5/2012 | Kelly | |

FOREIGN PATENT DOCUMENTS

| | | |
|---|---|---|
| DE | 102009034350 A1 | 2/2011 |
| WO | 99/63414 A1 | 12/1999 |

OTHER PUBLICATIONS

Rosetto L et al: "Control Techniques for Power Factor Correction Converters", Proceedings of PEMC 1994, Jan. 1, 1994, pp. 1310-1318, XP007920948, p. 1312-1313; Illustrations 5,6.

* cited by examiner

*Primary Examiner* — Tung X Le
(74) *Attorney, Agent, or Firm* — Volpe and Koenig, P.C.

(57) ABSTRACT

For the purpose of power factor correction of an operating device for a lamp, an inductor (7) is supplied with an input voltage (Vin), a controllable switch element (13) coupled with the inductor (7) being opened or closed to optionally charge or discharge the inductor (7). A control unit (14) for controlling the switch element (13) is designed such that it determines, depending on an output voltage (Vout) of the power factor correction circuit, a switch-on time (Ton) for switching the switch element (13) on and controls the switch element (13) optionally according to at least a first operating mode and a second operating mode, the operation in the first operating mode and the operation in the second operating mode being dependent on the duration of the determined switch-on time (Ton).

14 Claims, 3 Drawing Sheets

OPERATING DEVICE FOR A LAMP HAVING A POWER CORRECTION CIRCUIT

FIELD OF THE INVENTION

Figure 1:
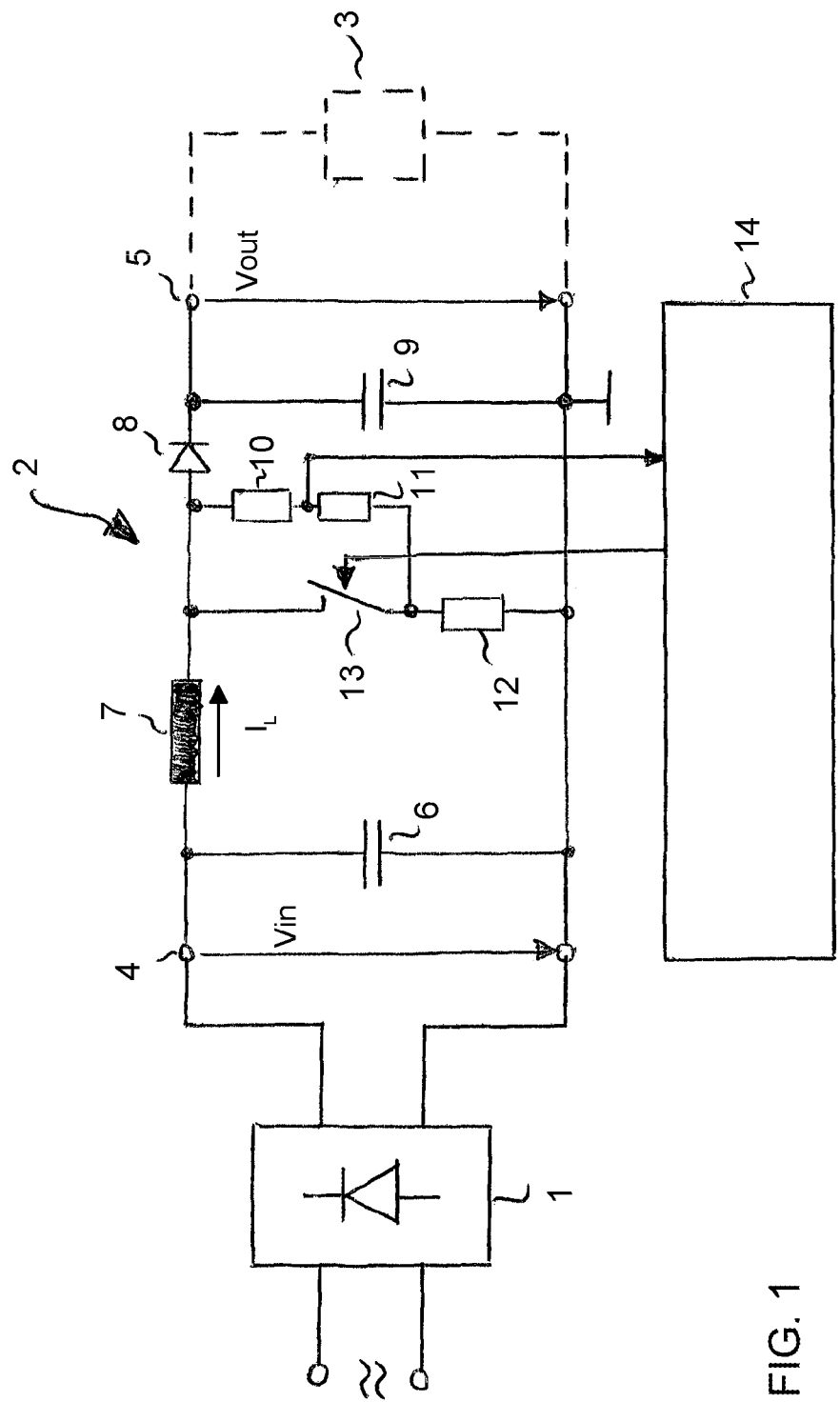

The present invention relates to an operating device for a lamp comprising power factor correction and a method for operating an operating device for a lamp comprising power factor correction. In particular, the invention relates to the technical field of operating devices for a lamp having power factor correction by means of an AC-to-DC converter, wherein the invention is preferably suitable for operating devices or electronic control gear for lamps such as light-emitting diodes or gas discharge lamps.

BACKGROUND

Operating devices for a lamp are nonlinear since they have a combination of a rectifier and a downstream driver circuit, which is in the form of an inverter or AC-to-DC converter and which is used to operate the lamp. In addition, the characteristic of the lamp is often nonlinear, wherein this applies, for example, to light-emitting diodes or else gas discharge lamps, in particular fluorescent lamps. Accordingly, even in the case of such electronic control gear or other operating devices for lamps, power factor correction circuits are often used, wherein this is also recommended since the permissible return of harmonics into the supply system is regulated by standards.

Power factor correction (PFC) is used to eliminate or at least reduce harmonic currents in an input current. Harmonic currents can occur in particular in the case of nonlinear consumers, such as, for example, rectifiers with downstream smoothing in switched mode power supplies, since, in the case of such consumers, the input current is phase-shifted despite the sinusoidal input voltage and is distorted non-sinusoidally. The relatively high frequency harmonics occurring in the process can be counteracted by an active or clocked power factor correction circuit connected upstream of the respective device since the power factor correction eliminates the nonlinear current consumption and shapes the input current such that it is substantially sinusoidal.

A circuit topology which is based on a boost converter, which is also referred to as a step-up converter, is often used for power factor correction circuits. In this case, an inductance or coil, to which a rectified AC voltage is supplied, is charged with an input current or discharged during switch-on/switch-off of a controllable switch. The discharge current of the inductance flows via a diode to the output, which is coupled to an output capacitance, of the converter, with the result that an increased DC voltage in comparison with the input voltage can be tapped off at the output. Likewise, however, other types of converters are also conventional in power factor correction circuits, such as flyback converters or buck converters, for example.

Such a power factor correction circuit can be operated in various operating modes, which are described with reference to a boost converter in "Control Techniques For Power Factor Correction Converters", L. Rosetto, G. Spiazzi, P. Tenti, Proc. of PEMC 94, Warsaw, Poland, pp. 1310-1318, 1994, by way of example. In particular, operation with a continuous current by means of the abovementioned inductance (so-called "continuous conduction mode", CCM), operation with a discontinuous inductance or coil current ("discontinuous conduction mode", DCM) or operation in the limit range between continuous and discontinuous current through the inductance ("borderline conduction mode" or "boundary conduction mode", BCM) is known.

Thus, for example, during BCM operation, each time the coil current drops to zero during the discharge phase of the coil this is taken as a cause for starting a new switching cycle and switching on the switch again in order to recharge the coil. During DCM operation, on the other hand, once the coil current has dropped to zero during the discharge phase, first a predetermined additional time is waited until the switch is closed again.

In respect of the further details relating to the individual known operating modes, reference is made to the full content of the abovementioned publication.

The individual operating modes have various advantages, with the result that changeover often takes place between the respective operating modes depending on the operating conditions of the power factor correction circuit during operation.

In this case, there is, in principle, the problem of controlling the transition between the individual operating modes reliably and using simple means.

SUMMARY

The present invention is therefore based on the object of providing a circuit and a method for power factor correction for an operating device for lamps, wherein a simple and in particular adjustable changeover between the different operating modes is possible. In particular, an easily adjustable transition between the DCM and BCM operating modes should be possible.

This object is achieved according to the invention by an operating device for lamps comprising a power factor correction circuit and a method for operating an operating device for lamps comprising power factor correction as claimed in the independent claims. The dependent claims define advantageous and preferred embodiments of the invention.

The operating device according to the invention for lamps comprising a power factor correction circuit comprises an inductance which is coupled to an input terminal and a controllable switching means, wherein the inductance is optionally charged or discharged by closing and opening of the switching means. The discharge current occurring during discharge of the inductance is passed to an output terminal of the circuit. Furthermore, a control unit is provided which establishes a switch-on time for switching on the switching means depending on the output voltage and actuates the switching means optionally in accordance with at least a first operating mode and a second operating mode, wherein it actuates the switching means either in accordance with the first operating mode or the second operating mode depending on the duration of the established switch-on time.

In this way, a defined transition between the different operating modes is possible using simple means.

In accordance with a preferred embodiment of the invention, the switch-on time for the switching means is established on the basis of a comparison of a setpoint switch-on time, which is determined depending on the output voltage, and a minimum switch-on time, wherein in particular the minimum switch-on time is variable for matching the transition between the first operating mode and the second operating mode. This ensures that the transition between the operating modes can be matched to different operating conditions, in particular different load conditions, in a simple manner.

The first operating mode may be in particular operation of the power factor correction circuit with a discontinuous inductance current ("discontinuous conduction mode", DCM), and the second operating mode can be operation in the limit range between continuous and discontinuous current ("borderline conduction mode", or "boundary conduction mode", BCM). In principle, however, the invention can also be applied to other operating modes of a power factor correction circuit.

In accordance with one exemplary embodiment of the invention, the control unit actuates the switching means in accordance with the first operating mode if the setpoint switch-on time is greater than the minimum switch-on time, while otherwise it actuates the switching means in accordance with the second operating mode.

If the second operating mode is the BCM operation, the control unit can preferably be configured such that it determines the difference between the setpoint switch-on time and the minimum switch-on time and establishes the wait time up to the beginning of a new discharge cycle of the inductance, i.e. up to renewed closing of the switching means, depending on the difference, wherein the wait time is established depending on the difference on the basis of a predetermined characteristic or table which is stored in the control unit.

The circuit according to the invention is used in particular for power factor correction for an AC-to-DC converter, with the result that, in this case, the input voltage is a rectified AC voltage and the output voltage is a DC voltage. Furthermore, the power factor correction circuit according to the invention is preferably designed in accordance with the topology of a boost converter, with the result that the discharge current of the inductance is supplied via a diode to the output terminal, which is coupled to an output capacitance. It goes without saying, however, that the invention can also be applied to other converter topologies, which can be used in a power factor correction circuit.

The control unit according to the invention is preferably in the form of an integrated circuit, in particular an ASIC circuit, and has only one common measurement input for detecting a measured variable corresponding to the output voltage and a measured variable corresponding to the current through the inductance or a zero crossing of this current, wherein, furthermore, an output of the control unit is provided for outputting the control signal to the switching means, which is preferably in the form of a FET switch, with the result that the control unit can be designed with only two pins.

The power factor correction circuit according to the invention is in particular configured for operation in an operating device for a lamp or for operation with electronic control gear for a lamp, wherein the lamp can be a discharge lamp, a fluorescent lamp or a light-emitting diode or the like. In this application case, the above-described invention makes it possible for the power factor correction circuit to be matched to different power levels or components of the respectively used operating device or control gear in a simple manner.

The invention also relates to a method for operating an operating device for a lamp comprising power factor correction for an AC-to-DC converter, comprising the following steps:

applying an input voltage to an inductance, optionally charging and discharging the inductance by closing and opening a switching means coupled to the inductance, establishing a switch-on time for the switching means depending on an output voltage of the converter, and actuating the switching means optionally in accordance with at least a first operating mode and a second operating mode, wherein the switching means is actuated optionally in accordance with the first operating mode or the second operating mode depending on the duration of the established switch-on time.

BRIEF DESCRIPTION OF THE PREFERRED EMBODIMENTS

The present invention will be explained below with reference to the drawings on the basis of preferred embodiments.

Figure 2:
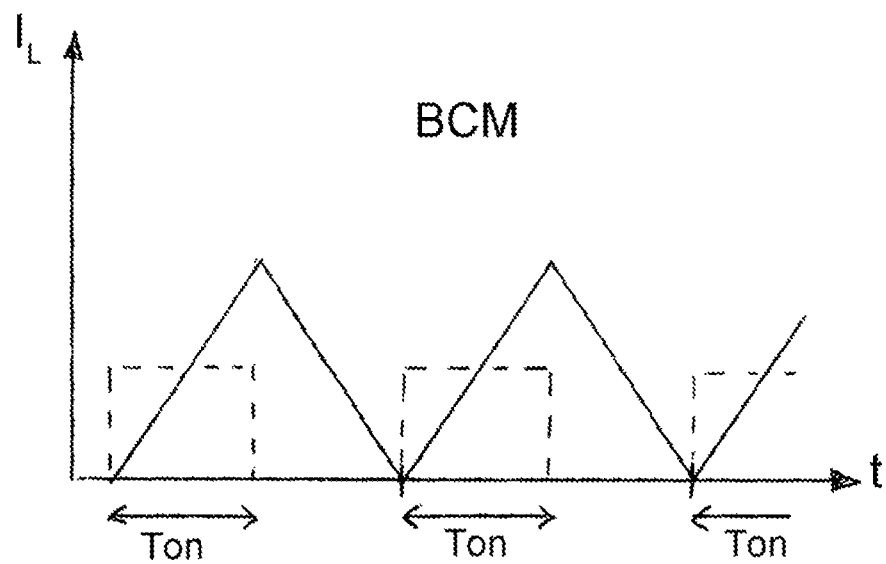
Figure 3:
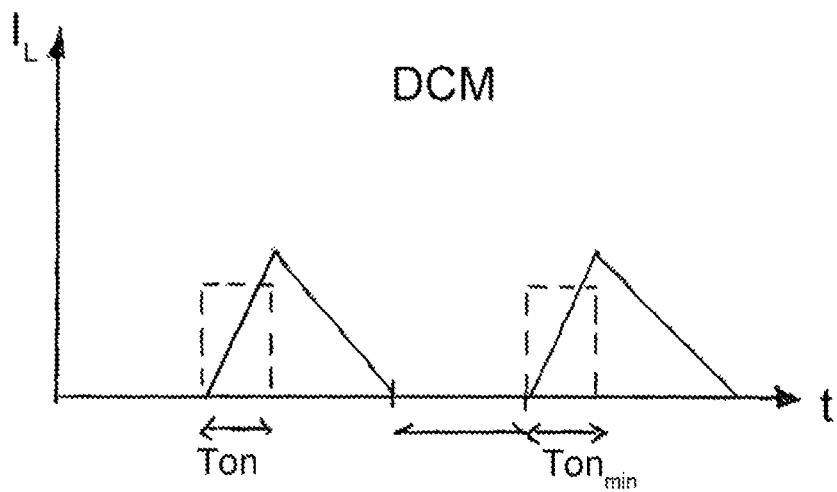
Figure 4:
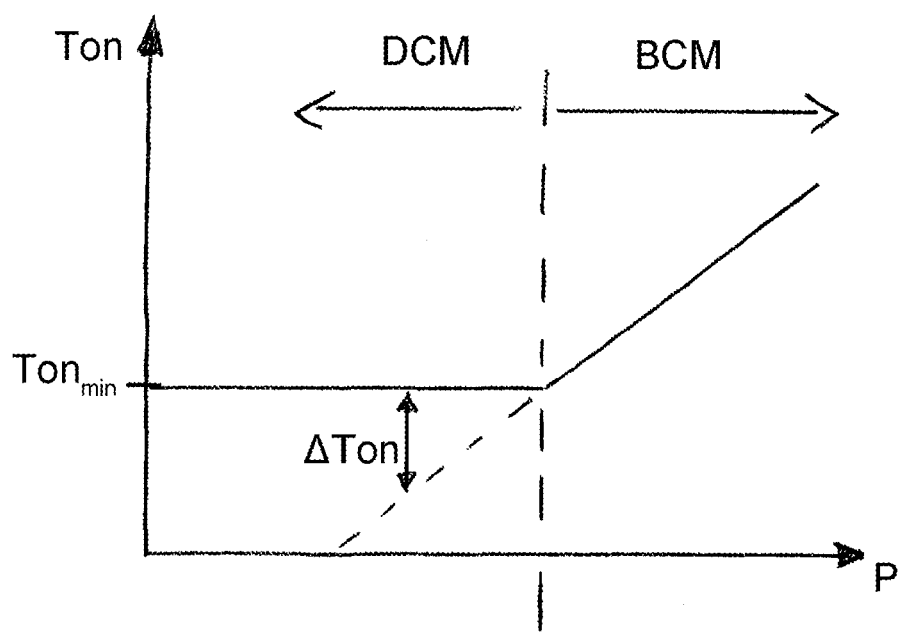
Figure 5:
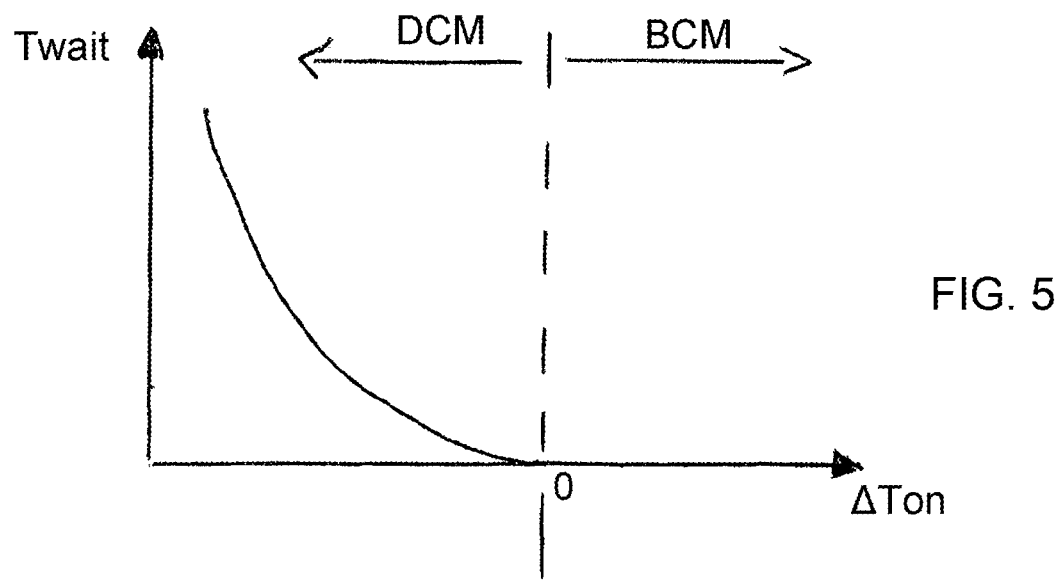

FIG. 1 shows a power factor correction circuit in accordance with an exemplary embodiment of the invention, FIG. 2 shows a representation illustrating a boundary conduction mode (BCM) of the power factor correction circuit, FIG. 3 shows a representation illustrating a discontinuous conduction mode (DCM) of the power factor correction circuit, FIG. 4 shows a representation illustrating a transition between the BCM and DCM in accordance with a preferred exemplary embodiment of the invention, and FIG. 5 shows a representation illustrating the determination of a wait time in the DCM.

DETAILED DESCRIPTION OF THE PREFERRED EMBODIMENTS

FIG. 1 illustrates a power factor correction circuit 2 of an operating device for lamps. The power factor correction circuit 2 is illustrated on the basis of an AC-to-DC converter in accordance with a preferred exemplary embodiment of the present invention. The other parts of the operating device for lamps are not illustrated; only a load 3 is illustrated symbolically.

In this case, it is assumed in FIG. 1 that an AC supply voltage, for example the system voltage, is converted by a rectifier 1 into a rectified AC voltage, which is therefore present between an input terminal 4 of the power factor correction circuit 2 and ground as AC input voltage Vin. The AC input voltage Vin is filtered by a smoothing capacitor 6 and supplied to an inductance or coil 7. The inductance 7 is connected in series with a diode 8 between the input terminal 4 and an output terminal of the power factor correction circuit. A DC output voltage Vout is provided at the output terminal 5, which is coupled to an output DC voltage capacitor 9.

The DC output voltage Vout serves the purpose of supplying power to a load 3, with the power factor correction circuit 2 connected upstream of said load. The load may be, for example, a driver circuit for a lamp such as a fluorescent lamp, a halogen lamp, a light-emitting diode arrangement etc. Typically, such a driver circuit is in the form of an inverter or else in the form of an AC-to-DC converter, which drives the lamp. For example, the driver circuit can be in the form of a flyback converter, an insulated flyback converter or in the form of a resonant half-bridge. The driver circuit can also be formed with electrical isolation and have a transformer, for example. A plurality of driver stages for actuating one or more lamps can also be fed by the power factor correction circuit 2.

A controllable electronic switch 13, which can be in the form of a field-effect transistor, for example, is connected to the connection between the inductance 7 and the diode 8, wherein the switch 13 in the embodiment illustrated is connected to ground via a shunt resistor 12. A series circuit comprising two resistors 10, 11, the series circuit is connected to a node between the switch 13 and the shunt resistor 12, is connected in parallel with the switch 13. The resistors 10, 11 preferably have much higher resistance values than the shunt resistor 12.

In the switched-on state of the switch 13, the inductance 7 is connected to ground via the switch 13 and the shunt resistor 12, wherein the diode 8 turns off, with the result that the inductance 7 is charged and energy is stored in the inductance. If, however, the switch 13 is switched off, i.e. open, the diode 8 is on, with the result that the inductance 7 can be discharged to the output capacitor 9 via the diode 8, and the energy stored in the inductance 7 is transferred to the output capacitor 9.

The switch 13 is actuated by a control unit 14, which is preferably in the form of an integrated circuit, in particular in the form of an ASIC. The power factor correction is achieved by repeatedly switching on and off the switch 13 at a much higher frequency than the frequency of the rectified AC input voltage Vin. The frequency of the switch-on and switch-off operations of the switch 13 and therefore of the charging and discharging cycles of the inductance 7 can typically be in the region of several 10 kHz.

In the embodiment of the power factor correction circuit 2 illustrated in FIG. 1, which is based on the topology of a boost converter (so that the output voltage Vout is greater than the input voltage Vin), targeted switching on and off of the switch 13 and determination of the corresponding switch-on durations depending on the output voltage Vout and in particular depending on the zero crossing of the current $I_L$ flowing through the inductance 7 take place. In certain operating modes, in particular in the so-called continuous conduction mode with a continuous current through the inductance 7, however, switching can also take place depending on other current limit values being reached.

In the embodiment shown in FIG. 1, both the output voltage Vout and the current $I_L$ through the inductance 7 can be monitored with the aid of only one measurement circuit, which comprises the resistors 10 and 11 already mentioned above, wherein an input of the control unit 14 is connected to a measurement point between the two resistors 10, 11.

During switching-on of the switch 13, the current $I_L$ through the inductance 7 increases linearly, wherein the current $I_L$ flows via the switch 13 and the shunt resistor 12 to ground, with the result that the voltage drop across the shunt resistor 12 is a measure of the charging current and therefore of the current flowing through the switch 13. Since, in the charging phase, the switched-on switch 13 short-circuits the series circuit comprising the resistors 10 and 11, the voltage present at the input of the control unit 14 is therefore a measure of the current $I_L$ flowing through the switch 13.

If the switch 13 is switched off, the current $I_L$ through the inductance 7 decreases linearly again and flows via the diode 8 to the load 3. The diode 8 is on during the discharge phase, wherein the output voltage Vout differs from the voltage drop across the resistors 10-12 slightly by the voltage drop across the diode 8. This voltage difference between the output voltage Vout and the voltage present at the node between the inductance 7 and the switch 13 is only significant when the discharge current $I_L$ approaches or crosses the zero line. In the case of this event, referred to as "zero crossing detection" (ZCD), the voltage present at the node between the inductance 7 and the switch 13 demonstrates a downward voltage bend, while the output voltage remains virtually unchanged. The voltage present at the input of the control unit 14 during the discharge phase is a measure of the voltage drop across the series circuit comprising the resistors 10-12. Therefore, during the majority of the discharge phase, the output voltage Vout can be detected by monitoring this voltage and, at the end of the discharge phase, a ZCD event with respect to the current $I_L$ can be detected, both by the control unit.

The control unit 14 can use the information on the actual value of the output voltage Vout to determine the next switch-on duration for the switch 13, wherein this can take place, for example, on the basis of a comparison of the measured output voltage Vout with a fixed reference voltage. Depending on this comparison result, the switch-on duration of the switch 13 is matched correspondingly by the control unit 14 using closed-loop control in order to obtain the desired output voltage.

The occurrence of a ZCD event in the profile of the current $I_L$ is used, on the other hand, to determine the next switch-on time for the switch 13. This can take place depending on the respective operating mode of the power factor correction circuit in a variety of ways.

FIG. 2 shows, by way of example, the profile of the current $I_L$ for the case of operation in the limit range between continuous and discontinuous current ("boundary conduction mode", BCM). With this control concept, the switch 13 is switched on with a switch-on duration Ton determined depending on the actual value of the output voltage Vout, wherein the switch 13 is always switched on when the current $I_L$ through the inductance 7 has decreased to zero again, with the result that the current profile shown in FIG. 2 is produced. The state of the switch 13 is illustrated by dashed lines in FIG. 2. The converter is thus, so to speak, operated in the limit range between operation with continuous current and operation with discontinuous current.

FIG. 3 shows, on the other hand, by way of example the profile of the current $I_L$ for operation with a discontinuous current profile ("discontinuous conduction mode", DCM). Similarly to the BCM in FIG. 2, in this case the current also increases linearly when the switch 13 is switched on, wherein, however, when the current is decreased to the zero line after switching-off of the switch 13, a new switching cycle is not immediately started, but an additional wait time Twait is waited until renewed switch-on of the switch 13. Only once this wait time Twait has elapsed is the switch 13 switched on again in order to recharge the inductance 7. Thus, the discontinuous current profile shown in FIG. 3 results.

The transition between the operating modes shown in FIG. 2 and FIG. 3 can take place on the basis of the switch-on time of the switch 13, in particular on the basis of a comparison of the setpoint switch-on time determined by the control unit for the switch 13 with a predeterminable minimum switch-on time $Ton_{min}$.

As has already been explained above, the control unit 14, during continuous operation, detects the actual value of the output voltage Vout and compares this with a determined reference value. Depending on this comparison result, the control unit establishes a setpoint value for the switch-on time in order to be able to adjust the output voltage to the respectively desired value by corresponding actuation of the switch 13.

As shown in FIG. 4, in accordance with the preferred exemplary embodiment, provision is made for the power factor correction circuit 2 to be operated in the BCM if the setpoint switch-on time determined by the control unit is greater than the minimum switch-on time $Ton_{min}$. In all other cases, the DCM is in operation.

Likewise, FIG. 4 shows that, in the case of a BCM, the setpoint switch-on time determined by the control unit is actually established for actuating the switch 13, with the result that the profile which increases linearly, as illustrated in FIG. 4, for the switch-on time Ton of the switch 13 depending on the required output power P of the circuit results for the BCM. If, however, a DCM of the circuit takes place, the switch 13 is switched on constantly only with the minimum switch-on time $Ton_{min}$, i.e. the switch-on duration of the switch 13 is limited to the value of the minimum switch-on time $Ton_{min}$, wherein, in the DCM, the adjustment of the desired operating point is performed by suitably selecting the wait time Twait.

Overall, this therefore results in the profile shown in FIG. 4 for the switch-on time Ton of the switch 13, depending on the respectively required output power P, wherein, in the DCM, the switch-on time Ton is constantly limited to the value of the predetermined minimum switch-on time $Ton_{min}$, while, in the BCM, the switch-on time Ton corresponds to the setpoint switch-on time established by the control unit 14 depending on the output voltage Vout and increases linearly with the required output power. In FIG. 3, too, the switch-on time $Ton=Ton_{min}$ of the DCM, which is reduced in comparison with the switch-on time Ton of the BCM shown in FIG. 2, is illustrated.

In order to enable an adjustable transition between the DCM and the BCM, in the preferred embodiment, the value of the minimum switch-on time $Ton_{min}$ is variable, with the result that simple matching of the function of the power factor correction circuit to different load levels and different load components can be achieved by a user by suitably adjusting $Ton_{min}$, with the result that the transition point between the DCM and the BCM can be shifted variably along the Ton characteristic. It is thus possible in particular to provide for the user to be able to select from several predetermined values for $Ton_{min}$, depending on the respectively connected load. However, it is likewise also conceivable for there to be continuous adjustment of the value for $Ton_{min}$.

As has previously been indicated, in the DCM, the adjustment of the respectively desired operating point is performed on the basis of the switch-on duration of the switch 13, which is limited to $Ton_{min}$, by suitable selection or adjustment of the wait time Twait. The control unit 14 can be configured such that the internal controller only generates a setpoint value for the switch-on time of the switch 13 depending on the already described comparison of the actual value of the output voltage Vout with the predetermined reference value, which setpoint value is processed, as explained above with reference to FIG. 4, depending on the respective operating mode. In order to convert this setpoint value in the DCM into a suitable value for the wait time Twait, the difference ΔTon between the setpoint switch-on time provided by the controller of the control unit 14 and the minimum switch-on time $Ton_{min}$ is determined, as indicated in FIG. 4. This ΔTon information is finally converted by the control unit to give the respectively suitable value for the wait time Twait.

FIG. 5 shows, by way of example, the profile of a characteristic which can be used for converting the value ΔTon into a suitable value for the wait time Twait. FIG. 5 shows that, in the DCM, the wait time Twait increases as the difference ΔTon decreases. FIG. 5 likewise shows that the wait time Twait decreases to zero at the transition to the BCM since, in the BCM, by definition there is no switching-on of the switch 13 without an additional wait time. The characteristic shown in FIG. 5 can be stored in the control unit 14 in the form of a corresponding table, for example in the case of a digital configuration of the control unit 14.

What is claimed is:

1. An operating device (3) for a lamp having a power factor correction circuit (2), the operating device comprising an input terminal (4) for receiving an input voltage (Vin), an inductance (7), which is coupled to the input terminal (4), a controllable switch (13), which is coupled to the inductance (7), and which charges or discharges the inductance (7) by closing or opening, an output terminal (5) for outputting an output voltage (Vout), and a control unit (14) for actuating the switch (13), wherein the control unit (14) is configured such that the control unit (14) determines a switch-on time (Ton) for switching on the switch (13) depending on the output voltage (Vout) and actuates the switch (13) in accordance with either at least a first operating mode or a second operating mode, the control unit (14) is configured such that the control unit (14) actuates the switch (13) depending on the duration of the determined switch-on time (Ton) in accordance with either the first operating mode or the second operating mode, wherein the control unit (14) is configured in such a way that the control unit (14) determines the switch-on time (Ton) for the switch (13) based on a comparison of a setpoint switch-on time determined depending on the output voltage and a minimum switch-on time ($Ton_{min}$).

2. The operating device (3) for a lamp as claimed in claim 1, wherein the minimum switch-on time ($Ton_{min}$) is variable for matching a transition between the first operating mode and the second operating mode.

3. The operating device (3) for a lamp as claimed in claim 1, wherein the control unit (14) is configured such that the control unit (14) actuates the switch (13) in accordance with the first operating mode if the setpoint switch-on time is greater than the minimum switch-on time ($Ton_{min}$), while the control unit (14) actuates the switch (13) in accordance with the second operating mode.

4. The operating device (3) for a lamp as claimed in claim 1, wherein the control unit (14) is configured such that, in the first operating mode, it switches on the switch (13) for the duration of the setpoint switch-on time, then switches off the switch (13) and only switches on the switch (13) again when, during discharge of the inductance (7), a current ($I_L$) through the inductance (7) has decreased to a specific current limit value.

5. The operating device (3) for a lamp as claimed in claim 4, wherein the current limit value is zero.

6. The operating device (3) for a lamp as claimed in claim 1, wherein the control unit (14) is configured such that, in the second operating mode, the control unit switches on the switch (13) for the duration of the minimum switch-on time ($Ton_{min}$), then switches off the switch (13) and only switches on the switch (13) again once a wait time (Twait) has elapsed when it is established that a current ($I_L$) through the inductance (7) has decreased to a specific current limit value during discharge of the inductance (7).

7. The operating device (3) for a lamp as claimed in claim 6, wherein the control unit (14) is configured such that the control unit (14) determines a difference between the setpoint switch-on time and the minimum switch-on time ($Ton_{min}$) and establishes the wait time (Twait) depending on the difference.

8. The operating device (3) for a lamp as claimed in claim 6, wherein the control unit (14) establishes the wait time (Twait) depending on the difference on the basis of a predetermined characteristic.

9. The operating device (3) for a lamp as claimed in claim 1, wherein the controllable switch (13) is coupled to the output terminal (5) via a diode (8), with the result that, during discharge of the inductance (7), a current ($I_L$) through the inductance (7) is supplied to the output terminal (5) via the diode (8).

10. The operating device (3) for a lamp as claimed in claim 9, wherein the first operating mode is an operating mode with a current ($I_L$) through the inductance (7) in the limit range between a continuous and a discontinuous current.

11. The operating device (3) for a lamp as claimed in claim 9, wherein the second operating mode is an operating mode with a discontinuous current (IL) through the inductance (7).

12. The operating device (3) for a lamp as claimed in claim 9, wherein a detector (10-12), which is coupled to the control unit (14), which detects a measured variable corresponding to the output voltage (Vout) and a measured variable corresponding to a zero crossing of the current (IL) through the inductance (7) are provided.

13. A method for operating an operating device (3) for a lamp having power factor correction for an AC-to-DC converter (1, 2), the method comprising:
   applying an input voltage (Vin) to an inductance (7),
   charging and discharging the inductance (7) by closing and opening a switch (13) coupled to the inductance (7),
   establishing a switch-on time (Ton) for the switch (13) depending on an output voltage (Vout) of the converter (1, 2), and
   actuating the switch (13) in accordance with either at least a first operating mode or a second operating mode, wherein the switch (13) is actuated by a control unit (14) either in accordance with the first operating mode or the second operating mode depending on the duration of the established switch-on time (Ton) and wherein the control unit (14) is configured in such a way that the control unit (14) determines the switch-on time (Ton) for the switch (13) based on a comparison of a setpoint switch-on time determined depending on the output voltage and a minimum switch-on time ($Ton_{min}$).

14. A method for operating an operating device (3) for a lamp having power factor correction for an AC-to-DC converter (1, 2), the method comprising: applying an input voltage (Vin) to an inductance (7), charging and discharging the inductance (7) by closing and opening a switch (13) coupled to the inductance (7), establishing a switch-on time (Ton) for the switch (13) depending on an output voltage (Vout) of the converter (1, 2), and actuating the switch (13) in accordance with either at least a first operating mode or a second operating mode, wherein the switch (13) is actuated either in accordance with the first operating mode or the second operating mode depending on the duration of the established switch-on time (Ton), wherein the method is implemented using an operating device (3) for a lamp as claimed in claim 1.

* * * * *